US010514830B2

(12) United States Patent
Bacus et al.

(10) Patent No.: US 10,514,830 B2
(45) Date of Patent: *Dec. 24, 2019

(54) BOOKMARK OVERLAYS FOR DISPLAYED CONTENT

(71) Applicant: Amazon Technologies, Inc., Reno, NV (US)

(72) Inventors: Michael Patrick Bacus, Seattle, WA (US); Seth Daniel Micarelli, Duvall, WA (US); Alla Taborisskaya, Bothell, WA (US); Joseph King, Seattle, WA (US); Lutz Gerhard, Seattle, WA (US); Amanda Leigh Font, Kirkland, WA (US); Craig Reeves Brookes, Seattle, WA (US); Andrew Scott Craft, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/689,651

(22) Filed: Aug. 29, 2017

(65) Prior Publication Data

US 2017/0364221 A1  Dec. 21, 2017

Related U.S. Application Data

(63) Continuation of application No. 14/850,771, filed on Sep. 10, 2015, now Pat. No. 9,778,824.

(51) Int. Cl.
*G06F 3/0483* (2013.01)
*G06F 3/0485* (2013.01)
*G06F 3/0488* (2013.01)

(52) U.S. Cl.
CPC .......... *G06F 3/0483* (2013.01); *G06F 3/0485* (2013.01); *G06F 3/0488* (2013.01);
(Continued)

(58) Field of Classification Search
None
See application file for complete search history.

(56) References Cited

U.S. PATENT DOCUMENTS 6,658,623 B1  12/2003  Schilit et al.
9,778,824 B1  10/2017  Bacus et al.
(Continued)

OTHER PUBLICATIONS

Non-Final Office Action issued in co-related U.S. Appl. No. 14/850,771 dated Sep. 20, 2016.
(Continued)

*Primary Examiner* — Frank S Chen
(74) *Attorney, Agent, or Firm* — Hogan Lovells US LLP

(57) ABSTRACT

Virtual bookmarks can be set in digital content to enable a user to quickly locate a portion of interest. A user can provide an input to enter into an overview mode wherein multiple pages of content are displayed concurrently. The user can navigate through the pages, and when a bookmarked page is caused to no longer appear on the display an overlay element such as a thumbnail of the page can be positioned near the edge of the display, representing the current relative location of the page in the overview. A user can select one of the displayed pages to view, or can select the bookmark overlay element to return to the current page. A user can perform an action to cause the bookmarked page to be updated, or can perform various actions to cause multiple bookmarks to be created with respect to the content.

18 Claims, 5 Drawing Sheets

(52) U.S. Cl.
CPC .............. *G06F 2203/04803* (2013.01); *G06F 2203/04806* (2013.01)

(56) References Cited

U.S. PATENT DOCUMENTS

| | | |
|---|---|---|
| 2003/0142108 A1 | 7/2003 | Brown et al. |
| 2012/0030566 A1 | 2/2012 | Victor |
| 2012/0066630 A1 | 3/2012 | Kim et al. |
| 2013/0080884 A1 | 3/2013 | Lisse et al. |
| 2013/0198677 A1 | 8/2013 | Dash |
| 2013/0297206 A1 | 11/2013 | Heng et al. |
| 2014/0222413 A1 | 8/2014 | Rossmann |
| 2015/0100876 A1* | 4/2015 | Neugebauer .......... G06F 17/241 715/233 |
| 2016/0034430 A1 | 2/2016 | Beavers et al. |

OTHER PUBLICATIONS

Final Office Action issued in co-related U.S. Appl. No. 14/850,771 dated Mar. 17, 2017.
Notice of Allowance issued in co-related U.S. Appl. No. 14/850,771 dated Jun. 7, 2017.

\* cited by examiner

BOOKMARK OVERLAYS FOR DISPLAYED CONTENT

CROSS REFERENCE TO RELATED APPLICATIONS

This application is a continuation of allowed U.S. application Ser. No. 14/850,771 entitled "BOOKMARK OVERLAYS FOR DISPLAYED CONTENT," filed Sep. 10, 2015, which is incorporated herein by reference for all purposes.

BACKGROUND

Users are increasingly utilizing electronic devices to access various types of information. For example, a user wanting to read a book might purchase a digital version of the book for viewing on an electronic device, such as an e-book reader. Because only a limited number of pages of content can be displayed on such a device at any time, users often must use a navigational element, such as a scroll bar, page button, or scrollable touch screen, to maneuver between the various pages. While these mechanisms enable a user to quickly linearly scan through the content (i.e., from beginning to end), many of the pages may look alike such that the user may have difficulty in determining the current location in the content. Further, a user wanting to flip back and forth between positions in the content may have difficulty locating the appropriate positions, and the difficulty in switching between those positions can negatively impact the user experience.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure can overcome one or more of the above-referenced and other deficiencies in conventional approaches to enabling a user to navigate digital content using an electronic device. In particular, various embodiments provide for the bookmarking of content such that a user can quickly and easily navigate to a portion of interest. A user can provide input to cause a computing device to enter an overview mode, wherein multiple pages of content can be displayed concurrently, including a current or "bookmarked" page displayed in the center of the page array. The user can navigate through the pages, which in some embodiments can cause a bookmarked page to appear to "scroll off" the screen. In such a situation a selectable overlay element, or other such feature, can be displayed in a location associated with the current relative position of the bookmarked page. The overlay element can include a thumbnail image of the respective bookmarked page, enabling the user to more easily recall or determine the page associated with the bookmark. A page can be bookmarked in a number of different ways, whether manual or automatic, explicit or implicit. A user can then select one of the pages from the overview mode to go to that page, or can select one of the overlay elements to return to the corresponding bookmarked page or content. The bookmarks can refer to other elements as well, such as user notes, important passages, internal or external links, or annotations, among others. Various filters can be used to determine which bookmarks or other selectable elements are displayed and/or used for navigation. This non-linear navigation approach enables a user to quickly move back and forth between specific portions of content, where it may otherwise be difficult to locate those portions manually through a conventional navigation process.

Various other functions and advantages are described and suggested below as may be provided in accordance with the various embodiments.

Figure 1A:
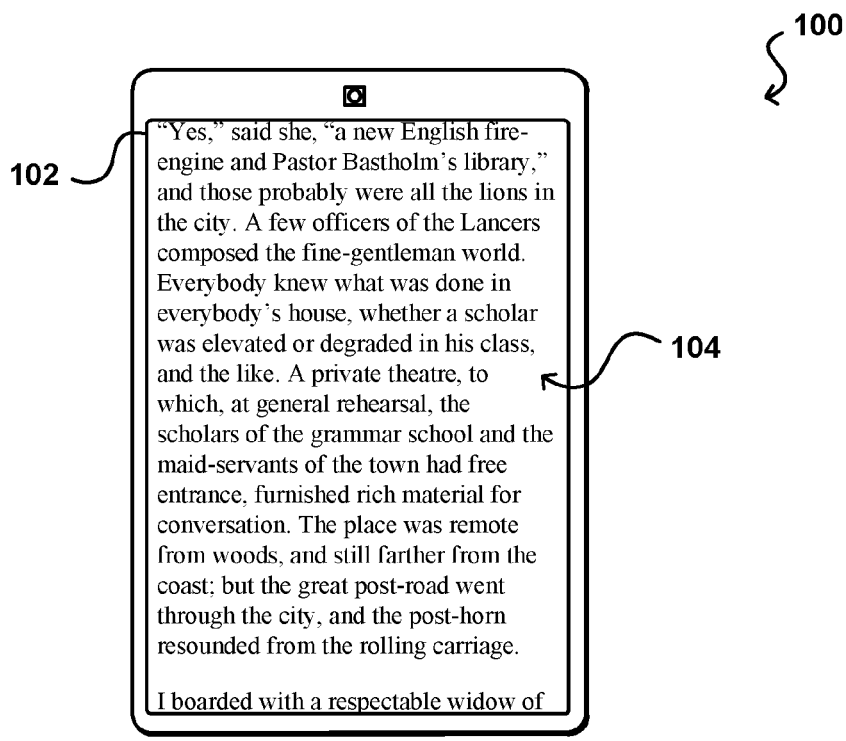
FIGS. 1A and 1B illustrates example page displays that can be presented in accordance with various embodiments.
Figure 1B:
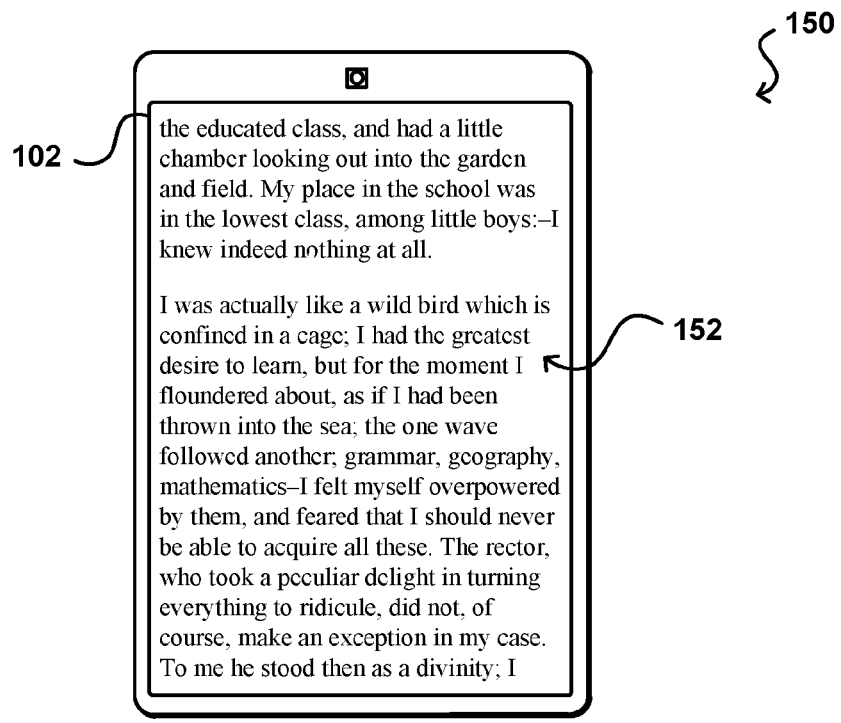

FIG. 1 illustrates an example display 100 of content on a computing device that can be presented in accordance with various embodiments. Although a portable computing device (e.g., an electronic book reader, smart phone, or tablet computer) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, and portable media players, among other such devices.

In this example the portable computing device is displaying a first page of content 104 on a display screen 102 of the device. As known for such uses, an electronic book ("e-book") reader or other such application can be executing on the device, which can display a portion of content, such as an e-book, wherein the portion displayed can depend upon factors such as the font size, margin size, line spacing, font type, screen size, etc., as well as a location in the content to which the user has navigated. A portion as used herein refers to a subset of words of the content as may be determined by the number of characters that can be supported by a page layout of the relevant device, where the characters of a page can flow based upon aspects of the device and various other settings discussed herein. Navigation often takes the form of virtual page turns, whereby a second screen of content 152 will be displayed, as illustrated in the example situation 150 of FIG. 1B. When the user gets to the end of the first page 104, the user can perform an action such as to select a page turn element or "swipe" across a touch screen in order to instruct a virtual page turn to be performed. The device can determine the portion of content corresponding to the direction of the page turn and that would occupy the screen given the font, screen size, and other such factors. In at least some embodiments the page breaks can be determined dynamically based at least in part upon these and other such factors. The next page of content can then be displayed.

As mentioned, however, such a navigational approach can be considered to be relatively linear, in that pages are displayed in sequence going either forward or backward through the page count. While such an approach can be desirable for conventional reading, such as where the user reads the content of the pages sequentially, one page at a time, such an approach may not be optimal for other navigational paths. For example, one page might include a table or image that the content will refer back to, or to which the user may want to periodically return during reading of the subsequent pages. The user would need to manually navigate back and forth between a current location in the content and the location of the content of interest, such as a table, in order to do the referring. As the separation between these locations increases, it can be increasingly difficult and frustrating for a user to locate the appropriate locations. In a physical book a user could use a finger or bookmark to hold the current place, or a place of a page of interest, that could enable the user to quickly refer back to that place. Unfortunately analogous mechanisms do not exist for e-books and other digital content using conventional display applications and interfaces.

Accordingly, approaches in accordance with various embodiments provide mechanisms for enabling users to quickly and easily transition between specific locations in a file or other grouping of digital content. In particular, various embodiments provide for thumbnail overlays, or other such selectable elements, that enable the tracking of specific locations in the content, and the return to those sections in response to the selection of corresponding elements or other such actions. These overlays can function as digital bookmarks, for example, and can be updated as appropriate or instructed by the user.

FIGS. 2A-2F illustrate an example approach to providing a digital bookmark with a content overview that can be utilized in accordance with various embodiments. In this example 200, a first page of content 202 is displayed on a screen of a portable electronic device, such as an e-book reader or tablet. In order to navigate through the content, the user can perform a conventional page turn input, such as to swipe the user's finger across the screen in the desired direction of the page flip. In this example, however, the user can alternatively perform a "zoom out" input or action in order to cause an overview of a relevant portion of the content to be displayed. In this example, the user is able to make a "pinch" gesture with the user's fingers, 204, such as by bringing the forefinger and thumb together on, or at a slight distance from, a surface of the touch screen. Various other zoom gestures or inputs can be used as well within the scope of the various embodiments. A "zoom" gesture can cause an array 212 of content pages to be displayed, as illustrated in the example situation 210 of FIG. 2B. As illustrated, the current page 214 in the content can be centered and highlighted, such as by providing a colored outline, animation, pointer, or other graphical indicia of the current page. In this example the current page is designated as the page that was displayed on the display screen when the user provided the zoom input. This can cause a virtual "anchor" or other tag or flag to be applied to the page, wherein that page can be tracked as the current page until another current page is selected or another such action performed. In some embodiments a user can manually set such a flag as discussed elsewhere herein. As mentioned elsewhere herein, the first word and last word of the current page can be tracked such that the appropriate portion of content can be displayed upon zooming back to the current page. If any display settings or other parameter values (i.e., font size or zoom level) are adjusted that would affect the number of words displayed on a given page, the first word and/or last word can be used, depending upon the navigation approach or other such aspect, to determine which portion of the content to display. In some embodiments the first word of a page will always be tracked for the current page to ensure that no words are missed, although other options such as the center word or a word associated with a viewing position can be used as well within the scope of the various embodiments.

Figure 2A:
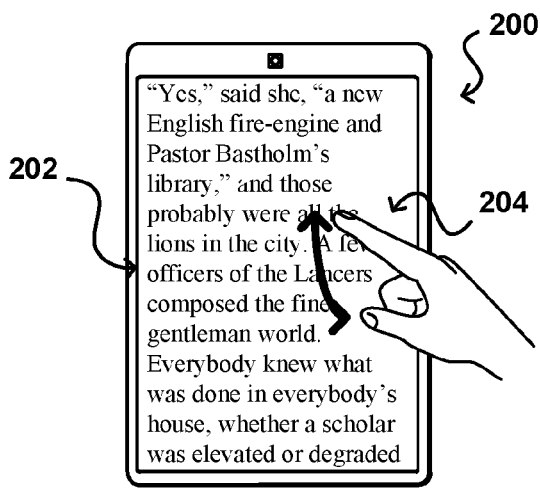
FIGS. 2A, 2B, 2C, 2D, 2E, and 2F illustrate displays of an example approach to keeping track of a current position in the content that can be utilized in accordance with various embodiments.
Figure 2B:
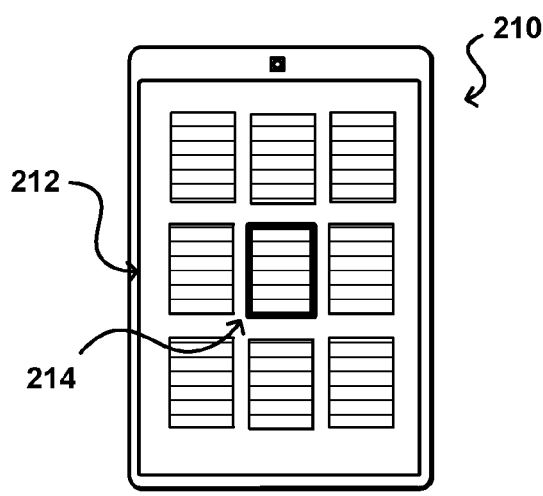

As illustrated in FIG. 2B, the display includes smaller versions of the current page (centered) as well as other adjacent pages in the content, such that the user can quickly view the content of those adjacent pages. While a 3×3 grid is displayed for purposes of explanation, it should be understood that fewer or additional pages can be displayed concurrently as well in other embodiments, as may be determined at least in part upon factors such as user preference, screen size, screen resolution, and the like. Further, while a centered location and outlined view are used to designate the current page in this example, it should be understood that various other ways of graphically indicating the current page can be utilized as well within the scope of the various embodiments. Further still, the content of each of the smaller versions can change as display parameters or other values are adjusted that affect the number of words displayed on each page.

Figure 2C:
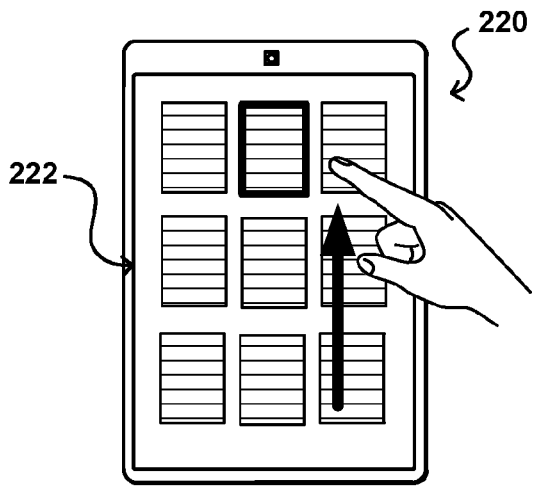

While such an array is displayed, a user can still have the ability to navigate through the content, such as by performing a swipe action with the user's finger(s) or a stylus, for example, as illustrated in the example situation 220 of FIG. 2C. Here, the user is performing a "scroll up" motion or gesture that causes pages subsequent to the current page to be displayed in the array. As illustrated, the current page is moved up towards the top of the display screen in the current view of content 222 resulting from the swipe motion. In some embodiments the pages to be displayed are determined dynamically, while in other embodiments page breaks might exist in the content or have been computed offline, among other such options.

Figure 2D:
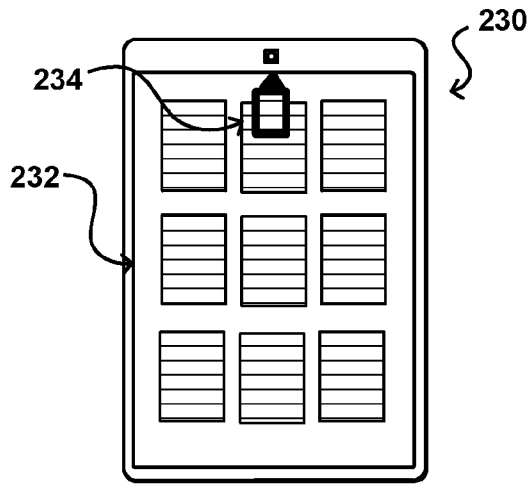
Figure 2E:
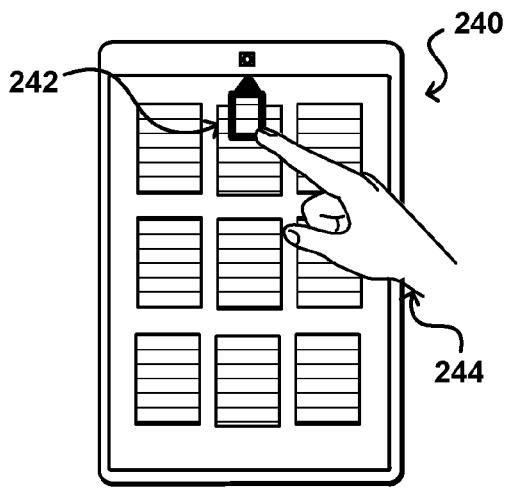
Figure 2F:
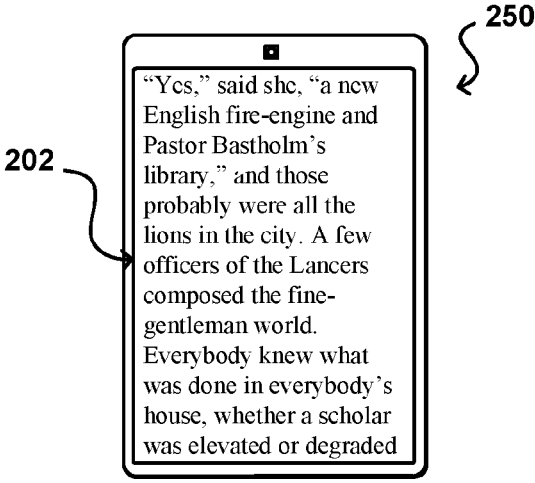

It might be the case that the user will navigate to the point where the current page will no longer be displayed in the content page array, as illustrated in the example situation 230 of FIG. 2D. While displaying several pages on the display concurrently can help facilitate the location of content, for situations where the content is relatively similar (e.g., only text) it can still be difficult to locate the desired portion(s) of the content. Accordingly approaches in accordance with various embodiments provide one or more indicia of location that can be used to return (or otherwise navigate) to a particular location of interest. In this example, the indicium takes the form of a graphical overlay 234 that indicates the relative location of the page of interest in the content being accessed. The overlay 234 can be user selectable, or otherwise correspond to a portion of the display that, when contacted by the user, provided instructions to display the corresponding page of content. In this example the overlay 234 corresponds to a thumbnail view of the current page, thereby facilitating the user in remembering which page corresponds to the overlay. Further, the overlay includes an arrow element indicating the direction of the current page, whereby the user can readily determine the direction of the current page from the position currently being viewed through the overview.

The user can thus navigate to view other pages through the overview, and can select any of those individual pages to view as desired. Selection of a page in this example can cause that full page to be displayed as the view "zooms in" from the overview to display the full selected page of content. In at least some embodiments, zooming in on a particular page does not cause that page to be bookmarked as the current page without further action or input. If the user instead wants to return to the "current" page, the user can select the overlay element 242 as illustrated in the example situation 240 of FIG. 2E, which can cause the current page to again be displayed as illustrated in the example situation 250 of FIG. 2F. In some embodiments selection of the overlay element 242 can instead cause the overview to first be re-centered on the current page, as illustrated in the example situation 210 of FIG. 2B. The user would then have to select the current page from the overview to obtain the full page view of FIG. 2F. In some embodiments the current page will remain designated the current page until an explicit action is taken, such as the user selecting an option to make a new page the current page. In other embodiments the current page can be updated through other actions, such as the user zooming into a different page, or zooming out from a different page. The ability to manually update the current page, or bookmarked page, provides control over which overlay elements are displayed and which pages can be accessed quickly from the overview display. The ability to update the current page based on a zoom action enables a quick and easy return to the current page, whether or not the user manually sets a bookmark for the page. Various other actions can be performed as well as discussed and suggested herein.

Figure 3A:
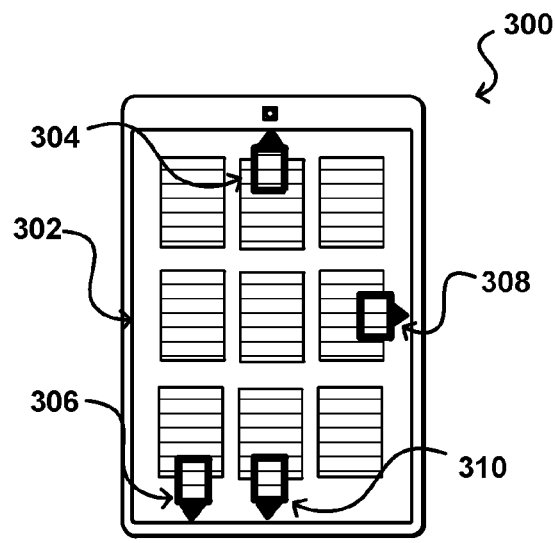
FIGS. 3A, 3B, 3C, and 3D illustrate example approaches for enabling a user to return to a specific page or portion of content that can be utilized in accordance with various embodiments.

The ability to set bookmarks in specific ways can also enable multiple bookmarks to be managed concurrently. For example, in the situation 300 of FIG. 3A there are four distinct pages that have selectable overlay elements 304, 306, 308, 310 that the user can utilize to navigate the content. These pages can have had tags or anchors manually or automatically applied as discussed and suggested elsewhere herein. As illustrated, there can be one previous page accessible using an overlay 304 towards the top of the screen, and two subsequent pages accessible using respective overlays 306, 310 towards the bottom of the screen. In situations where the content might be organized in additional directions, such as across in addition to up and down in the overview mode, another page might be accessible using an overlay 308 displayed to the right of the screen. This can occur, for example, when chapters or topics are separated vertically, but content pages within one of those chapters or topics is organized horizontally, among other such options. In other embodiments the content might be organized in a large array, with only a portion of that array being displayed at any time.

The ability to have multiple bookmarks available concurrently enables quick navigation back and forth between pages of interest. For example, there might be a set of images or tables that the user wants to continually refer to, and adding a bookmark for each enables the user to quickly access that content while also being able to quickly return to the current page. There also might be various rules, definitions, or other types of content to which the user may want to frequently refer, and the ability to set a bookmark for each simplifies navigation for the user. The user might also make specific notes, comments, or annotations to which the user might want to be able to refer, such that the user can bookmark these annotations for quick access. In other embodiments the creation of such an annotation might automatically cause such a bookmark to be generated.

In some embodiments the bookmarks might be created based upon user behavior. For example, if it is determined that a user is frequently returning to a particular page of content, or spending a significant amount of time on a particular page, a bookmark might be generated that includes a thumbnail of that page. A notification might also be provided to the user upon creation of such a bookmark so the user knows to take advantage of the bookmark. The frequent access of certain types of pages by the user can also cause bookmarks to automatically be generated for that type of page when present in content being accessed by the user, such as the first page of a glossary or table of formulas. The bookmarks in these embodiments can represent a history of user action with respect to certain content. The bookmarks can also be weighted by access or likelihood of return in some embodiments, which can affect which overlay elements are displayed, the size or position of those overlay elements, or other such options. In some embodiments where there are more bookmarks than can practically be displayed, the bookmarks displayed might be the highest weighted bookmarks and/or the closest bookmarks, or some combination thereof. In some embodiments an author or other entity associated with the content can specify a bookmark, such as to a map or family tree to which the user can refer while reading a story involving various locations or characters, etc. Various reasons for creating a bookmark can be used by any of a number of different entities to enable a user to quickly and easily access one or more specific portions of the content being displayed.

Figure 3B:
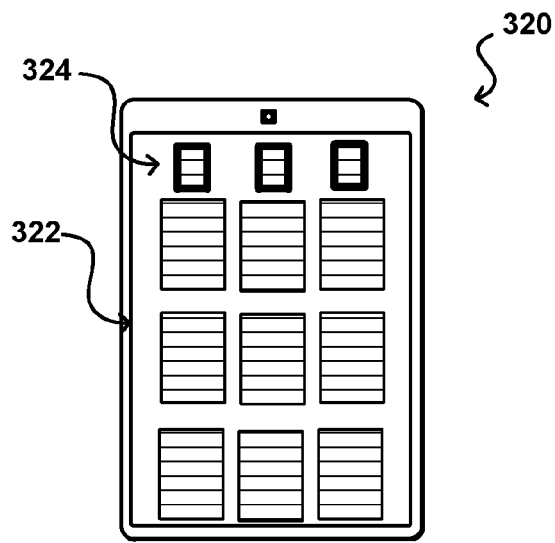

FIG. 3B illustrates another example situation 320 wherein multiple pages have bookmark elements displayed that can enable the user to quickly navigate to those pages. Here, instead of the overlays being at edges adjacent those pages in the overview, the bookmarks 324 can be positioned in a specified location, such as across the top of the page. This can enable the user to quickly access those bookmarks without having the bookmarks obscure any of the content in the overview. Further, such a layout can enable pages to quickly be bookmarked by "dragging and dropping" a page of the overview onto the bookmark space, whereby that page has a bookmark created and added to the space. A user can also use a similar technique to delete a bookmark from the area, such as by dragging and dropping a bookmark onto a trash icon (not shown) or holding over the icon for a period of time, among other such options. The user can also move the bookmark area to other portions of the screen, such as the side or bottom, etc.

Figure 3C:
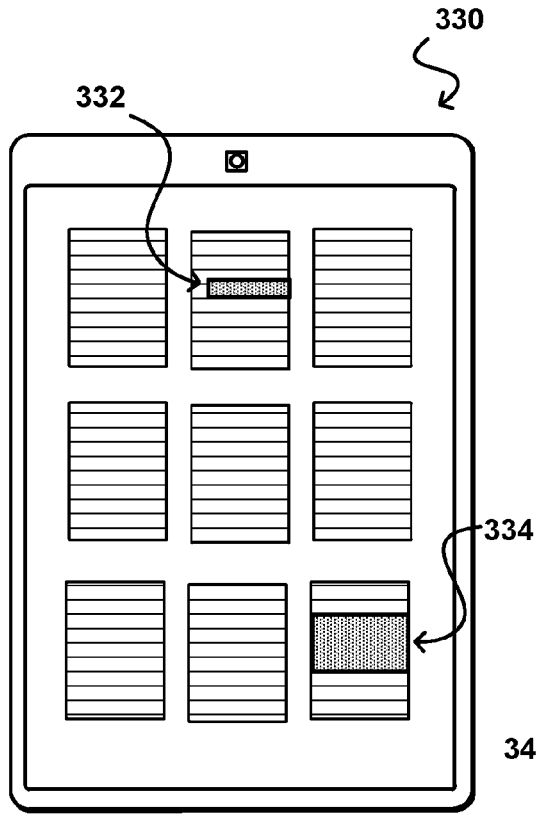

As mentioned, various annotations or comments can be displayed in the overview as well. For example, the situation 330 illustrated in FIG. 3C shows a pair of annotations 332, 334 on different pages in the overview. As with the bookmarked pages, these annotations can appear as overlay elements if navigated off the screen. In some embodiments the selection of an annotation in overview mode can cause the text of the annotation to be visible in the overview mode. In other embodiments the selection of an annotation can cause that page to be selected as the current page for display, whereby the annotation is available from the full page view. Various other actions can be performed as well, such as to enable the user to scroll through annotations or display only pages with annotations in the overview mode.

Figure 3D:
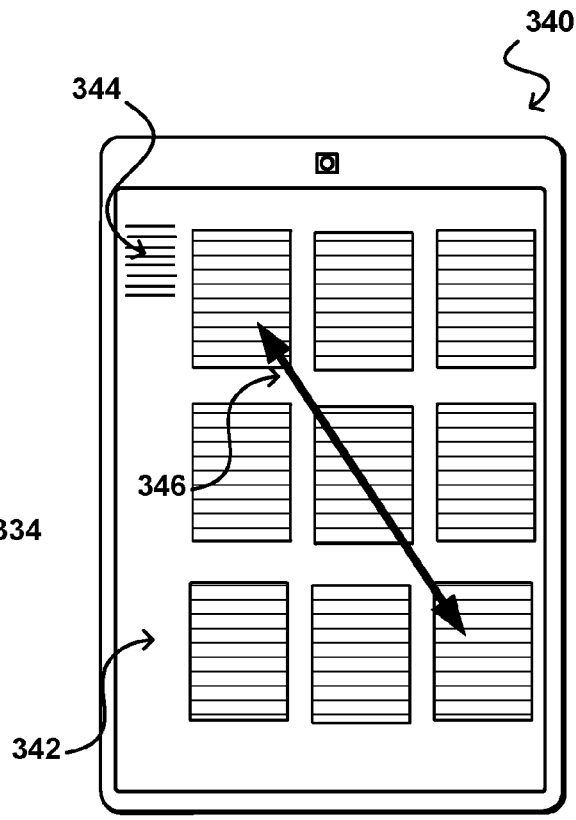

The ability to display only pages with annotations can be provided as a type of filter for the content. For example, the user might want to display pages for quick navigation that include annotation, graphics, tables, or other types of content. Accordingly, a set of filters 344 or other display options can be presented as illustrated in the example situation 340 of FIG. 3D. Here, one or more filters can be selected to have only that type of page displayed in the overview. In other embodiments the filters can cause specific types of pages to not be displayed in overview mode, such as pages that contain only text or only images. These filters can be specified by a provider, specified by the user, or a result of monitoring user behavior, among other such options. Links between pages can also be created via the overview mode. For example, an image on one page might correspond to description on another. A link can be created between those pages, such as may result from detecting the dragging of a finger from one page to another in the overview mode. In this way, the link can quickly be viewed in overview mode and the corresponding page of content selected. This can provide an advantage over just bookmarks, as the link enables content on different pages to be accessible from the related content, not just a general overview.

Figure 4:
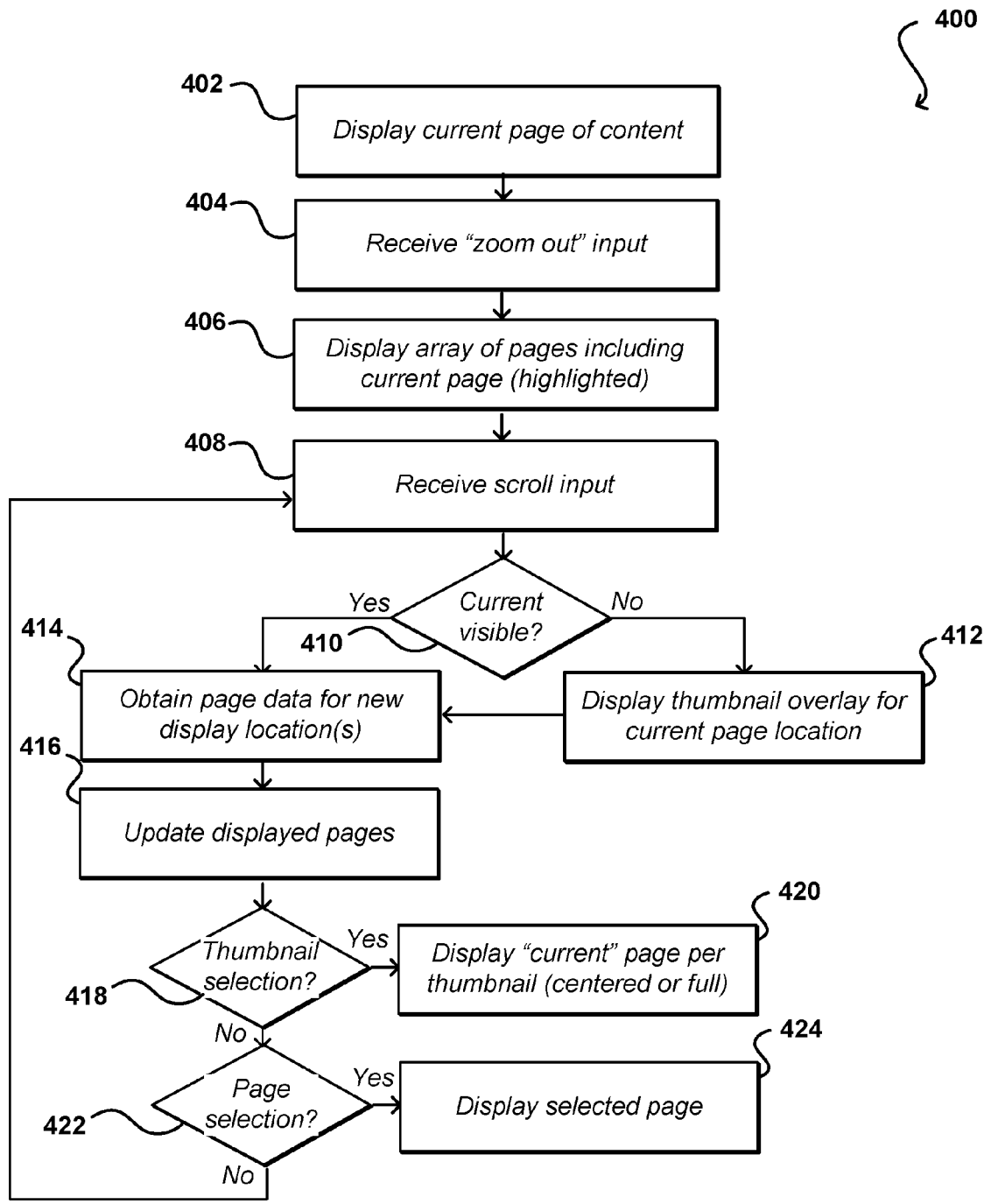
FIG. 4 illustrates an example process for tracking a current position in content that can be utilized in accordance with various embodiments.

FIG. 4 illustrates an example process 400 for providing an electronic bookmark that can be utilized in accordance with various embodiments. It should be understood that there can be additional, fewer, or alternative steps performed in similar or alternative orders, or in parallel, within the scope of the various embodiments unless otherwise stated. In this example, a current page (or other such grouping) of content is displayed 402 on an electronic device. As mentioned, the content can include any appropriate type of digital content, as may include text, graphics, audio, and/or video as part of an e-book, electronic document, webpage, and the like. The page can also be one of a set of pages that can be dynamically determined based upon factors such as font size, screen size, and screen resolution, among others. During the display of the page, a "zoom out" or similar input can be received 404, as may be the result of a pinch gesture or other such action on the part of the user. The zoom input can cause the current page to appear to "shrink" in the view such that an array of pages, including adjacent pages to the current page in the content, can be displayed 406 via the device. As mentioned, the input can cause the current page to be bookmarked such that the user can easily return to the current page. The current page can also be highlighted, outlined, or otherwise indicated as part of the array such that the user can easily determine which of the displayed pages in the array (i.e., a 3×3 array) correspond to the current and/or bookmarked page.

While the array of pages is displayed as part of an overview or similar mode, a scroll or similar navigation input can be received 408 that causes the displayed pages to appear to translate across the screen in a direction corresponding to the navigation input. This can cause certain pages to appear to scroll off the screen and new pages to appear to scroll onto the screen, thereby keeping the determined number of pages on the display as part of the overview mode. A determination can be made 410 as to whether the current bookmarked page is still visible on the screen as part of the overview array. If not, an overlay element can be displayed 412 near the location where the bookmarked page scrolled off the screen. As mentioned, the overlay element can be a thumbnail view of the bookmarked page enabling the user to quickly determine which page corresponds to the bookmark. Further, the element can be "selectable" in that input at a corresponding portion (i.e., group of pixels) of the touch screen can cause the bookmarked page to again be displayed. In addition, the page data for the new locations resulting from the navigation input can be obtained 414 and the updated pages displayed 416. If the current page is still visible in the array, the bookmark can still be represented by the highlight or other such mechanism. Further, in some embodiments the generation of the overlay might occur after or concurrently with the updated display of pages.

In the overview mode, the user can continue to scroll or otherwise navigate to view different pages or content. In addition to scrolling, the user can perform at least two other actions, which are shown in sequence here but could be performed in any order as mentioned above. It might be the case that the user performs a selection 418 of the thumbnail corresponding to the bookmarked current page (or another bookmarked page or location). If so, the bookmarked page can be caused to be displayed 420 per the bookmark. This can include, for example, re-centering the overview on the bookmarked page or leaving overview mode such that only the bookmarked page is displayed, among other such options. If the re-centered view is presented, the user may have to select the bookmarked page to obtain the full view. Otherwise, the user might make a selection 422 of one of the pages displayed in the array of the overview mode. Accordingly, the device can exit the overview mode and cause the selected page to be displayed on the device. As discussed, if the user performs a zoom action on this page in some embodiments the page will then become the current bookmarked page for purposes of tracking and user navigation, although other actions can be used to designate such pages as discussed and suggested elsewhere herein. In some embodiments a user might be able to select a "close" element to exit overview mode and go back to the current or last bookmarked page. In other embodiments, the user might be able to perform a reverse pinch gesture in order to cause a similar action to be performed. While gestures such as pinch gestures are discussed with respect to a touch screen, it should be understood that such gestures can be performed at a distance from the device and detected by cameras or other sensors within the scope of the various embodiments.

As mentioned, such an approach can utilize a set of dynamically generated filters with the overview mode as well. This can help to convey both user-provided data (annotations, highlights, notes, social annotations, search terms, most recently read position, etc.) and meta navigational information (as may be included in metadata for the book content or otherwise obtained), such as may include categories or chapter titles from a hierarchical book structure, tables of contents, indices, cover pages, and the like. In some embodiments the metadata may have come from an index generated of the e-book content. These can be displayed as part of the page tiles or as thumbnail overlay elements, among other such options. As mentioned, the user can have the ability to set filters or selections to cause any or all of these elements to be displayed (or not displayed), while in some embodiments the filters applied may depend at least in part upon the type of content displayed, among other such options. Such an approach can assist with the non-linear navigation scheme, and can help a user more quickly locate the content of interest. These components can also be presented as composited layers of overlays in some embodiments, enabling the user to navigate through additional dimensions to locate the content of interest. In some embodiments the user can zoom further out in order to view additional page tiles, view different levels, or otherwise obtain a different selection of content. A further zoom might show fewer pages but focus on potentially more relevant pages for search, such as pages that include images, annotations, titles, and the like.

In some embodiments the index data is stored as metadata with the content, while in other embodiments the index data could be stored as a separate file associated with the content. The file could be stored on the same device which is displaying the content or a remote device or service.

Figure 5:
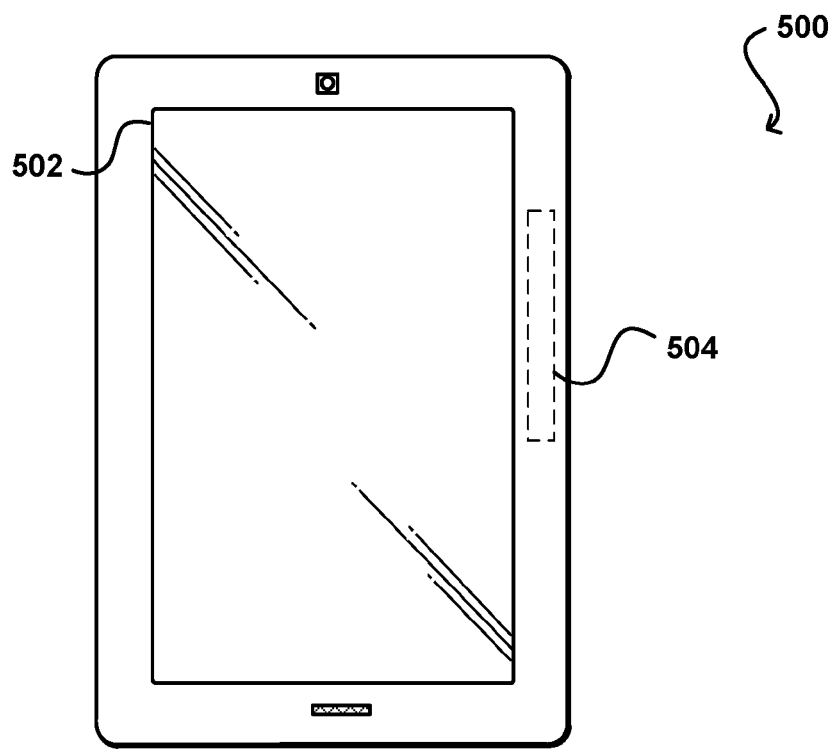
FIG. 5 illustrates an example device that can be used to implement aspects of the various embodiments.

FIG. 5 illustrates an example electronic user device 500 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 500 has a display screen 502 on the front side, which under normal operation will display information to a user facing the display screen (e.g., on the same side of the computing device as the display screen). The computing device in this example includes at least one camera or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 500 also can include at least one orientation sensor, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. The device also includes at least one communication subsystem 504, as may enable the device to communicate over at least one wired and/or wireless network, such as a 4G network, wireless Internet, and the like.

Figure 6:
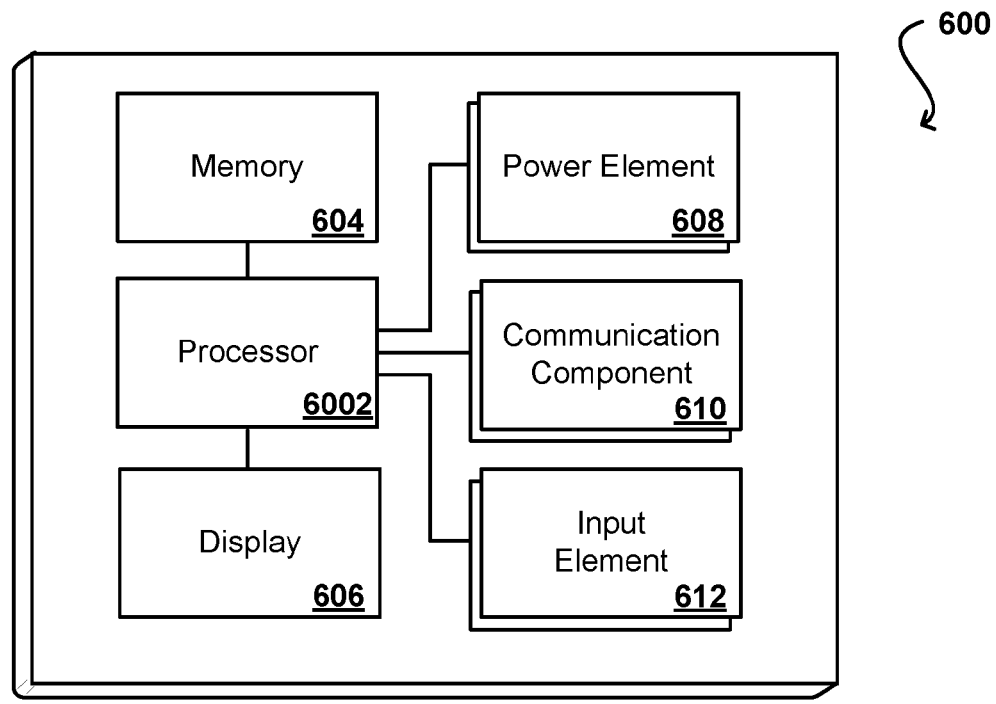
FIG. 6 illustrates example components of a computing device such as that illustrated in FIG. 5.

FIG. 6 illustrates a logical arrangement of a set of general components of an example computing device 600 such as the device 500 described with respect to FIG. 5. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. The device will typically also include some type of power element(s) 608, such as a battery compartment or wired power receiving mechanism. As discussed, the device in many embodiments will include at least one image capture element such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component, such as a mono or stereo microphone or microphone array, operable to capture audio information from at least one primary direction. A microphone can be a uni- or omni-directional microphone as known for such devices.

In some embodiments, the computing device 600 of FIG. 6 can include one or more network communication elements 610, such as a Wi-Fi, Bluetooth, RF, wired, or wireless communication system. The device in many embodiments can communicate with a network, such as the Internet, and may be able to communicate with other such devices. In some embodiments the device can include at least one additional input device 612 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 600 also can include at least one orientation or motion sensor (not shown). As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 602, whereby the device can perform any of a number of actions described or suggested herein.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Amazon Web Services®, Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate non-transitory media known or used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
a display screen;
at least one processor; and
memory including instructions that, when executed by the at least one processor, cause the system to:
determine a viewing position associated with a portion of content, the viewing position representing a first location of a first word and a second location of a last word of the portion of the content, wherein the first location of the first word and the second location of the last word of the portion of the content are based at least in part upon one or more aspects of the display screen;
receive an instruction to enter an overview mode for a display of the content;
change the viewing position to an overview mode;
display on the display screen, in the overview mode, an array of adjacent portions to the portion of the content based at least in part on the first location of the first word and the second location of the last word on the portion of the content, wherein an overlay element is enabled to indicate a virtual location of the portion of the content in response to a navigation input causing additional content to be displayed; and use the first word and the last word to determine which portion of the content to display for a first page on the display screen.

2. The system of claim 1, wherein the instructions when executed further cause the system to:
display a first bookmark element for the portion of the content among the array of adjacent portions of the content; and
generate a first tag indicating the portion of the content is a bookmarked portion.

3. The system of claim 2, wherein the instructions when executed further cause the system to:
display a second bookmark element indicating that an additional portion of the content is associated with a second tag, the additional portion of the content not displayed in the array of adjacent portions;
receive a first selection of the second bookmark element; and
display the additional portion of the content without the array of adjacent portions.

4. The system of claim 1, wherein the instructions when executed further cause the system to:
receive input from at least one of a user interface component, an application or a provider of the content; and
generate a new bookmark element for a specified portion of the content.

5. The system of claim 1, wherein the instructions when executed further cause the system to:
determine that at least one of a frequency of access, a total time of access, or a type of user interaction for a determined portion of the content satisfies at least one bookmark criterion; and
generate a new bookmark element for the determined portion of the content.

6. The system of claim 1, wherein the portion of content corresponds to at least one of a page, a chapter, an image, a video, a keyframe, an audio clip, an annotation, an important passage, an external link, an internal link, or a user comment.

7. The system of claim 1, wherein the instructions when executed further cause the system to:
detect, while displaying a current portion of the content, a subsequent instruction to enter the overview mode; and
tag the current portion of the content as a bookmarked portion.

8. A computer-implemented method, comprising:
determining a viewing position associated with a portion of content, the viewing position representing a first location of a first word and a second location of a last word of the portion of the content, wherein the first location of the first word and the second location of the last word of the portion of the content are based at least in part upon one or more aspects of a display screen;
receiving an instruction to enter an overview mode for a display of the content;
changing the viewing position to an overview mode;
displaying on the display screen, in the overview mode, an array of adjacent portions to the portion of the content based at least in part on the first location of the first word and the second location of the last word on the portion of the content, wherein an overlay element is enabled to indicate a virtual location of the portion of the content in response to a navigation input causing additional content to be displayed; and
using the first word and the last word to determine which portion of the content to display for a first page on the display screen.

9. The computer-implemented method of claim 8, further comprising:
linking the portion of the content to an additional portion of the content; and
displaying, in the overview mode, a graphical link between the portion and the additional portion as displayed in the array of adjacent portions.

10. The computer-implemented method of claim 8, further comprising:
determining the portion of the array of adjacent portions further based at least in part upon at least one of an application setting, a device type, or a screen size displaying the content.

11. The computer-implemented method of claim 8, further comprising:
receiving, while displaying the array of adjacent portions in the overview mode, navigation input to cause a different portion of the array of adjacent portions to be displayed;
displaying an animation based at least in part on the navigation input directing movement of the array of adjacent portions in at least one direction;
displaying the different portion of the array of adjacent portions; and
displaying, as an overlay with the different portion of the array of adjacent portions, a respective bookmark element for any bookmarked portion that is not displayed as part of the different portion of the array of adjacent portions.

12. The computer-implemented method of claim 8, further comprising:
displaying a set of filters with the array of adjacent portions, a first filter of the set of filters capable of causing a type of content to be displayed, or not displayed, as part of the array of adjacent portions.

13. The computer-implemented method of claim 8, further comprising:
displaying a bookmark element for the portion of the content among the array of adjacent portions of the content using a thumbnail view of the portion of the content.

14. The computer-implemented method of claim 8, further comprising:
enabling an adjacent portion of the array of adjacent portions to be tagged as a second bookmarked portion by (1) the adjacent portion being selected and (2) a motion performed on a computing device to cause the adjacent portion to appear dragged across a screen to a bookmark region for display.

15. The computer-implemented method of claim 8, further comprising:
displaying a first bookmark element for the portion of the content among the array of adjacent portions of the content;
generating a first tag indicating the portion of the content is a bookmarked portion;
displaying a second bookmark element indicating that an additional portion of the content is associated with a second tag, the additional portion of the content not displayed in the array of adjacent portions;
receiving a first selection of the second bookmark element; and
displaying the additional portion of the content without the array of adjacent portions.

16. A non-transitory computer-readable storage medium including instructions that, when executed by at least one processor of a computing device, cause the computing device to:
- determine a viewing position associated with a portion of content, the viewing position representing a first location of a first word and a second location of a last word of the portion of the content, wherein the first location of the first word and the second location of the last word of the portion of the content are based at least in part upon one or more aspects of a display screen;
- receive an instruction to enter an overview mode for a display of the content;
- change the viewing position to an overview mode;
- display on the display screen, in the overview mode, an array of adjacent portions to the portion of the content based at least in part on the first location of the first word and the second location of the last word on the portion of the content, wherein an overlay element is enabled to indicate a virtual location of the portion of the content in response to a navigation input causing additional content to be displayed; and
- use the first word and the last word to determine which portion of the content to display for a first page on the display screen.

17. The non-transitory computer-readable storage medium of claim 16, wherein the instructions when executed further cause the computing device to:
- display a first bookmark element for the portion of the content among the array of adjacent portions of the content;
- generate a first tag indicating the portion of the content is a bookmarked portion;
- display a second bookmark element indicating that an additional portion of the content is associated with a second tag, the additional portion of the content not displayed in the array of adjacent portions;
- receive a first selection of the second bookmark element; and
- display the additional portion of the content without the array of adjacent portions.

18. The non-transitory computer-readable storage medium of claim 16, wherein the instructions when executed further cause the computing device to:
- display a bookmark element for the portion of the content among the array of adjacent portions of the content using a thumbnail view of the portion of the content.

* * * * *